United States Patent [19]
Merchant et al.

[11] Patent Number: 5,623,345
[45] Date of Patent: Apr. 22, 1997

[54] FACSIMILE COMMUNICATION WITH A SELECTIVE CALL SYSTEM AND METHOD THEREOF

[75] Inventors: Zaffer Merchant, Lantana, Fla.; Ali Saidi, Atlanta, Ga.

[73] Assignee: Motorola, Inc., Schaumburg, Ill.

[21] Appl. No.: 399,024

[22] Filed: Mar. 6, 1995

[51] Int. Cl.⁶ .............................. H04N 1/40; H04N 1/41; G06K 9/00
[52] U.S. Cl. ...................... 358/407; 358/426; 358/448; 382/186; 382/258
[58] Field of Search .................................. 358/426, 447, 358/451, 462, 448, 453, 467, 443, 407; 382/254, 256, 258, 259, 186, 187, 177, 178, 179; 340/825.44, 825.48, 825.69; 379/825.72, 56, 57

[56] References Cited

U.S. PATENT DOCUMENTS

| | | | |
|---|---|---|---|
| 4,149,145 | 4/1979 | Hartke et al. | 340/739 |
| 4,703,511 | 10/1987 | Conoval | 382/13 |
| 5,224,179 | 6/1993 | Denker et al. | 382/55 |
| 5,331,431 | 7/1994 | Jasinski | 358/462 |
| 5,392,130 | 2/1995 | Mahoney | 358/400 |
| 5,402,504 | 3/1995 | Bloomberg et al. | 382/9 |
| 5,434,953 | 7/1995 | Bloomberg | 395/139 |
| 5,455,898 | 10/1995 | Mahoney et al. | 395/133 |

*Primary Examiner*—Scott A. Rogers
*Attorney, Agent, or Firm*—Keith A. Chanroo

[57] ABSTRACT

A selective call communication system (10) receives hand written information from a facsimile machine (14) to be delivered to a plurality of selective call receivers (40). The selective call receiver (40) is capable of receiving facsimile information and has a receiver (24) for receiving the hand written information, a processor (20) for processing the hand written information. The processor has an image thinner (206) for thinning each line of the hand written information, a line segment locator (208) for locating the lines of the hand written information having end points, a line segment extractor (210) for extracting the lines of the hand written information and defining the lines of the hand written information as line segments, and a line segment organizer (212) for organizing the line segments to recover the hand written information. The selective call communication system (10) also has a transmitter (30) for transmitting the line segments of hand written information to an at least one selective call receiver (40) capable of receiving facsimile information.

20 Claims, 7 Drawing Sheets

FACSIMILE COMMUNICATION WITH A SELECTIVE CALL SYSTEM AND METHOD THEREOF

FIELD OF THE INVENTION

This invention relates in general to selective call systems, and more particularly to a selective call system capable of facsimile communication.

BACKGROUND OF THE INVENTION

Contemporary selective call receiver communication systems employ messaging schemes that can deliver voice, numeric, or alphanumeric messages to its user. The majority of selective call systems transmit address and message information using a protocol such as GSC (Motorola's Golay Sequential Code), POCSAG (Great Britain's Post Office Code Standardisation Advisory Group) or FLEX™. To originate a message or page, a base station (or selective call terminal) is typically accessed via a Public Switch Telephone Network (PSTN) from a telephone.

In the case of transmission of facsimile type messages to selective call receivers, the information is scanned in by facsimile machine, transferred and processed by the selective call system and then transmitted to a selective call receiver designated by the address. Unfortunately, the transmission of FAX information results in a large amount of information being processed by the selective call messaging (paging) systems, and the data transport protocols do not gracefully allow for the transmission large amount of information. As is well known, selective call receivers are powered by limited energy content battery supplies that are quickly degraded when receiving and displaying long messages.

One area of growing concern is the ability to send a handwritten message via a facsimile machine to a wireline device, for example selective call receivers. While contemporary facsimile communication equipment employ data compression techniques in their coding formats, such data compression techniques are inadequate for adequately preserving the battery life of the selective call receivers. Furthermore, the long data messages indicative of facsimile communication destroy the battery saving schemes currently being employed with selective call communication systems, because the long textual messages require the information to be fragmented and then transmitted to the selective call receivers. This degradation in battery live of the selective call receiver makes facsimile communication unattractive to the users of selective call receivers even though the need exists.

Thus, what is needed is a method and apparatus, in a selective call communication system, for providing facsimile communication of hand written textual messages to selective call receivers without severely destroying their battery lives.

Figure 1:
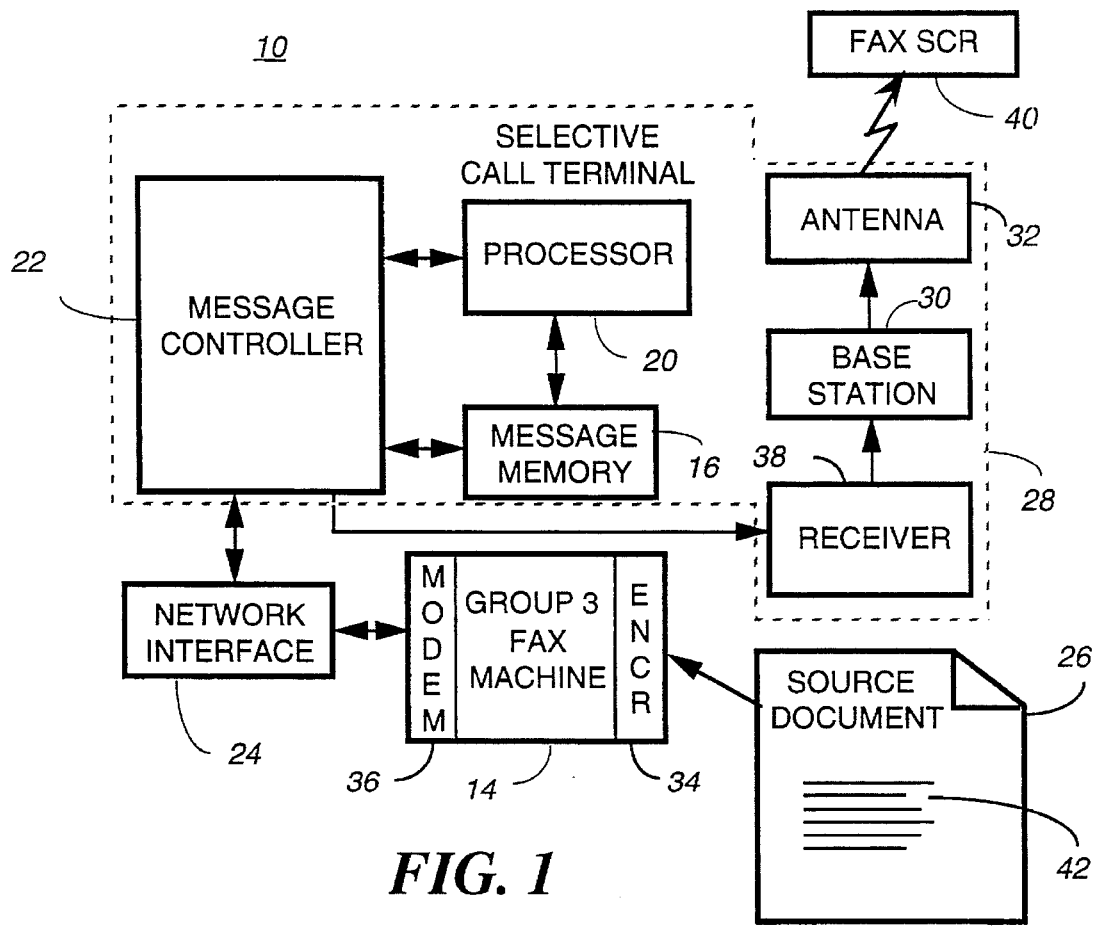
FIG. 1 is an electrical block diagram of a selective call system in accordance with the preferred embodiment of the present invention.

After the document has been entered into the FAX machine 14, the entire source document 26 including handwritten message or line drawing information is scanned and quantized (retrieved). Thereafter, the information is encoded and compressed by the encoder 34 in the FAX machine preferably according to the Group III FAX coding scheme which is well known to one of ordinary skill in the art. The Group III facsimile (FAX) machine is defined under the CCITT (Consultative Committee on International Telegraph and Telephone). The Group III Facsimile Standards for encoding and compressing data are performed using the coding scheme known as the modified Huffman code. The modified Huffman code uses the standard Huffman code in conjunction with the modified READ (Relative Element Addressing Designate) code. Once the information is Group III encoded and compressed, it is transferred by the modem 36 to the message controller 22 via the PSTN 24. The message controller 22 directs the information to a processor 20 for providing additional processing of the information suitable for selective call communication. After storing at least a portion of the information in a message memory 16, the processor 20 and the message controller 22 begin decoding the information before the information can transferred to the subscribers to which it is intended. When the selective call terminal 28 has completed decoding the incoming FAX information, the information is processed according to the preferred embodiment of the present invention to be discussed in further details. Thereafter, the processed

DESCRIPTION OF A PREFERRED EMBODIMENT

Referring to FIG. 1, an electrical block diagram of a selective call communication system 10 is shown in accordance with the preferred embodiment of the present invention. Operationally, a user enters a source document 26 into a facsimile (FAX) machine (scanner) 14. The FAX machine 14 retrieves (or scans) and quantizes an image (message or information) 42 contained thereon. As is well known to one of ordinary skill in the art, the FAX machine comprises an encoder 34 and a modem 36 for encoding the received information and transmitting the received information from the FAX machine 14. Preferably, the information or message comprises handwritten message or line drawing information 42 to be retrieved from the source document 26.

The FAX machine 14 is coupled to a message controller 22 of a selective call terminal 28 via a network interface 24. The network interface 24, well known to one of ordinary skill in the art, can include a Public Switch Telephone Network (PSTN) or an Integrated Service Digital Network (ISDN). It can also be appreciated by one of ordinary skill in the art that the FAX machine 14 can be directly connected to the message controller 22 via a high speed network (e.g., RS-232, IEEE 802.3) to achieve an extremely high speed message throughput. Therefore, the FAX machine 14 needs not be located at the same physical site as the selective call terminal 28. Actually, the FAX machine 14 can be replaced by, for example, a computer, a conventional document scanner, or possibly a dedicated message entry device, each capable of communicating with the message controller 22 via the network interface 24.

To send a FAX to a subscriber (a person or device having a FAX selective call receiver 40), the sender, for example, enters the subscriber's cap-code (address) and other system information including hand written message or line drawing information on the source document 26. The sender can send a FAX, by alternatively, calling a subscriber's paging service provider using a conventional telephone to enter, for example, the user's cap-code number (a unique number assigned by the paging service provider that corresponds to the actual coded address of the selective call receiver 40) and other system information. The paging information is transferred to a receiver 38 which receives the information and a transmitter which comprises a base station 30 and an antenna 32, broadcasts a signal modulated with the processed FAX information including the selective call address and the hand written line drawing information. A selective call receiver 40 is then able to detect its address, recovers the information, alerts the user, and makes the received information available for presentation to the user in the handwritten line drawing format in which the information was received.

Figure 2:
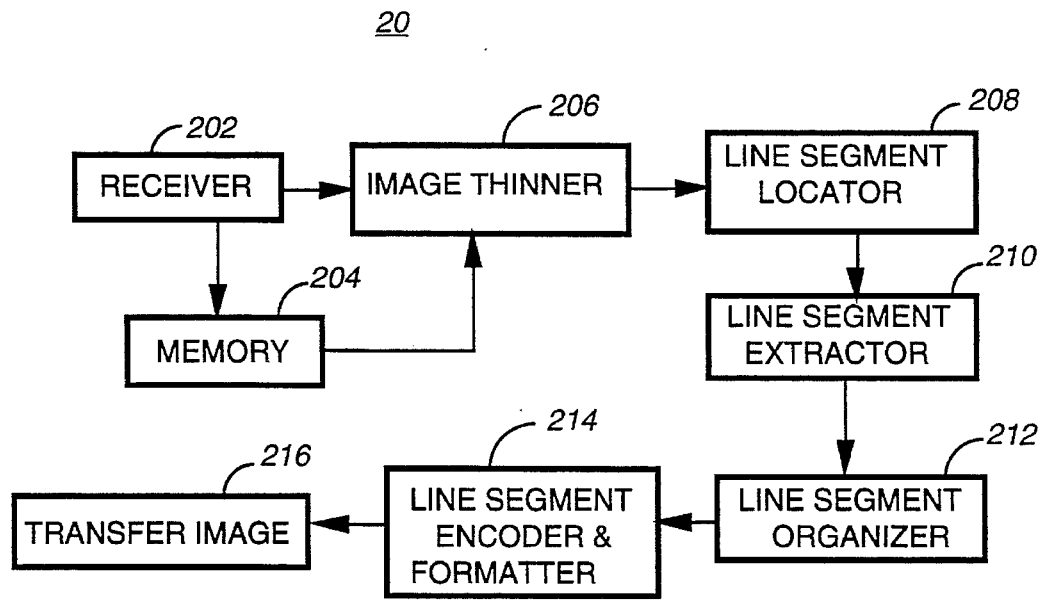
FIG. 2 is an electrical block diagram of a processor of the selective call system of FIG. 1 according to the preferred embodiment of the present invention.

Referring to FIG. 2, an electrical block diagram of the processor of the selective call system of FIG. 1 is shown according to the preferred embodiment of the present invention. Preferably, the processor 20 comprises a receiver 202 which receives the information and stores it in a memory 204. An image thinner 206 can receive the information directly from the receiver 202 or alternately from the memory 204. The image thinner 206 thins the lines of the information by reducing the width of each line of the hand written message or the line drawing to the thickness of one picture element (pixel). The skeleton of the line drawing is obtained via a thinning algorithm. Thinning therefore reduces the line drawing to single pixel thickness so that any pixel not at an intersecting node has no more than two neighbors.

Figure 3:
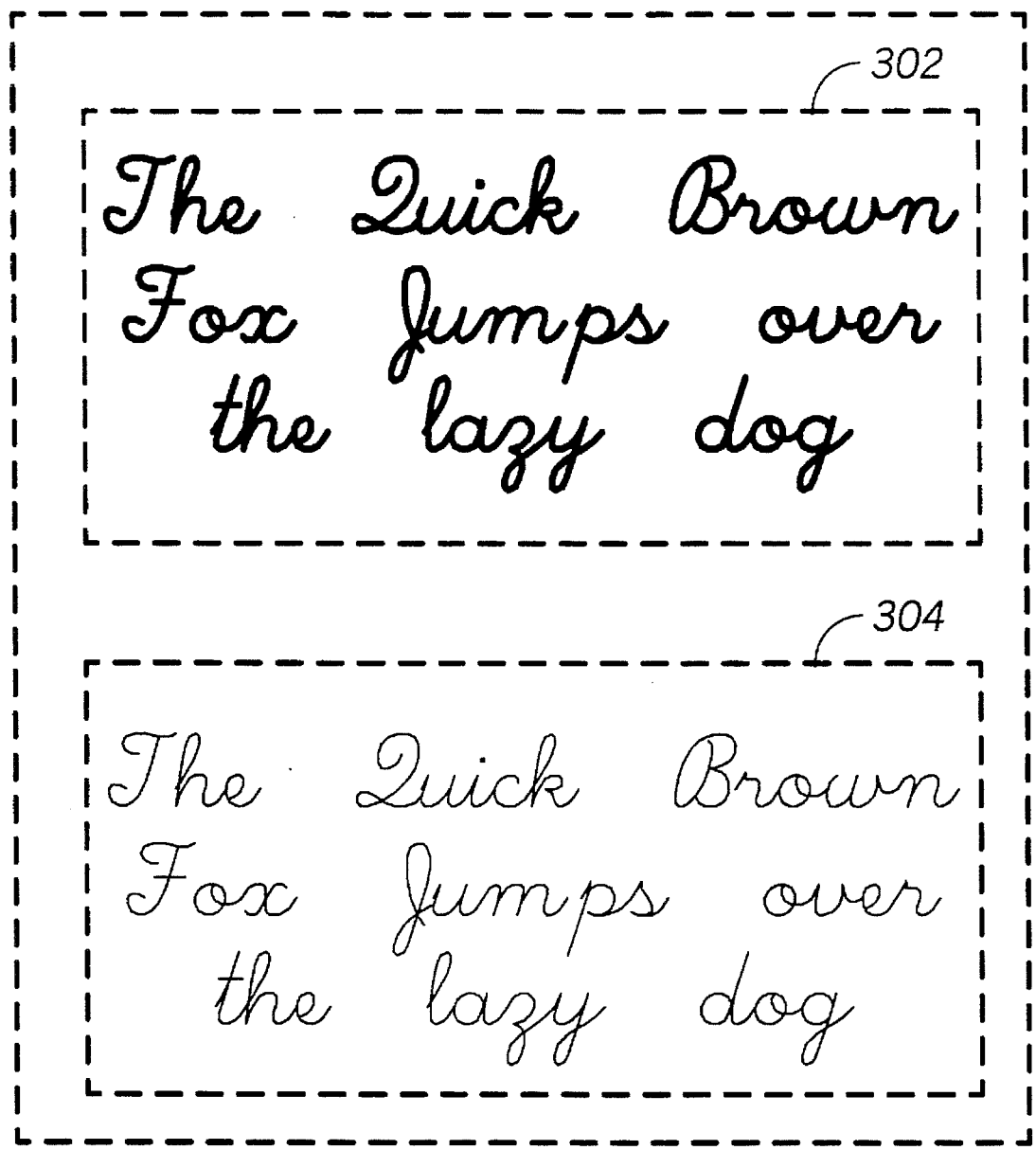
FIG. 3 illustrates the hand written information before and after processing in accordance with the preferred embodiment of the present invention.

Referring to FIG. 3, an image of the hand written text message or line drawing is shown according to the preferred embodiment of the present invention. The image comprises the text message 302 before the image is thinned and the text message 304 after the image is thinned.

Referring back to FIG. 2, after the image thinner 206 has thinned the information, the information is processed by a line segment locator 208 locates end points and a line segment extractor 210 estimates and defines line segments to reduce the hand written information to a graph of (x, y) co-ordinate points. A line segment is a sequence of consecutive pixels that are adjacent to each other defining a portion of an image of the line drawing. The line segment extractor 210 extracts the image by an iterative two pass procedure over the image. In the first pass, the line segment extractor 210 identifies lines or line segments of the image with end points; and in the second pass, the line segment extractor 210 extracts lines that do not have end points. End point are pixels in a consecutive sequence of pixels of a line that has only one immediate neighboring (adjacent) pixel. Once the line segment extractor 210 defines and extracts all the line segments with end points, the line segment extractor 210 begins the second pass extracting the remaining line segments that have no end points. The line segment extractor 210, for example, can be stopped when all the pixels has been extracted or when the number of pixels remaining fall below a threshold number. The image of the hand written message before it is extracted is in the bit map or raster format, but after it is extracted, each pixel is assigned an X-co-ordinate point and an Y-co-ordinate point, (x,y). When all the pixels have been assigned (x, y) co-ordinate points, the image is reformatted as electronic ink format or representation. A line segment organizer 212 organizes the lines to enable the reconstruction of the image. A line segment encoder and formatter 212, after the lines of the image information are extracted, formats the lines of the image information by categorizing the lines of the image information to improve the reconstruction of the extracted lines of the image information in the electronic ink format. The line segment encoder and formatter 212 encodes the extracted information to enable the hand written information to be transmitted 216 using one of the well known selective call system protocols.

In this way, a hand written note or message can be FAXed to a selective call receiver capable of displaying graphic information. The hand written information is represented as a raster bit-map image which is downsampled to adequate resolution and compressed using Huffman coding. Converse to electronic pen systems, the hand written information is not encoded with the (x, y) coordinate points, i.e., the time sequence of the points is not available and must be generated. Therefore, by thinning the information, a line segment is extracted and encoded with the (x, y) co-ordinate to enable reconstruction after transmission. Accordingly, the information to be FAXed represented as a scanned line drawing is formatted with the dynamic pixel information similar to electronic ink to achieve both higher compression and compatibility with selective call systems and electronic pen systems.

Figure 4:
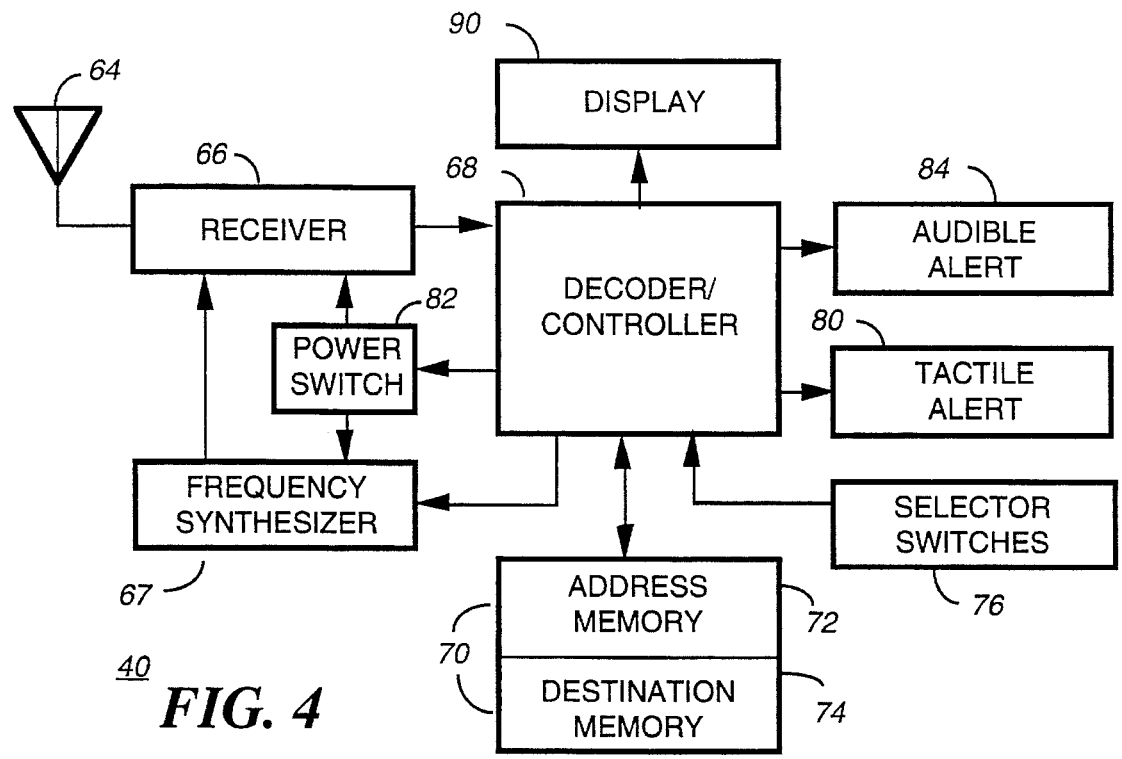
FIG. 4 is an electrical block diagram of a selective call receiver in accordance with the preferred embodiment of the present invention.

Referring to FIG. 4, an electrical block diagram of the selective call receiver 40 is shown in accordance with the preferred embodiment of the present invention. The selective call receiver 40 comprises an antenna 64 for intercepting transmitted radio frequency (RF) signals which is coupled to the input of a receiver 66. The receiver 66 provides for reception of transmissions on a single reception frequency, or, as will be further described below, reception on multiple reception frequencies. When multiple frequency reception is provided, a frequency synthesizer 67 enables the generation of the multiple reception frequencies in a manner well known to one of ordinary skill in the art. The receiver 66 receives and demodulates the transmitted signals, preferably frequency modulated data signals, providing at the output of the receiver a stream of binary data signals corresponding to the destination IDs transmitted from any particular destination location. The binary data signals are coupled into the input of a decoder/controller 68 which processes the signals, in a manner well known in the art. The received destination IDs are compared with the predetermined destination ID corresponding to the destination to which the subscriber has preselected. A memory 70, coupled to the decoder/controller 68, includes a table of destination IDs, or addresses, which are stored in a destination memory 74 section of the memory 70. Selector switches 76 are provided to enable the selection of one or more destination addresses identifying destinations at which the subscriber wishes to be notified. A display 90 is used to display the destination information stored in the destination memory 74 for enabling the subscriber to readily select the destination at which an alert is desired, as will be described below. The decoder/controller 68 compares the received destination IDs with the predetermined destination address selected by the subscriber from the destination memory 74, and when a match is detected, the decoder/controller 68 generates an alert enable signal which is coupled to the input of a sensible alerting device, such as a tactile alerting device 80. The tactile alerting device 80 preferably provides a silent vibratory output alerting the subscriber that the destination selected is being approached.

When the selective call receiver 40 is used to provide both destination notification alerting and paging capability including FAX capability, the addresses assigned to the selective call receiver 40 for use in the selective call communication system are stored in an address memory 72 portion of memory 70. The decoder/controller 68 then controls the generation by the frequency synthesizer 67 of the selective call system's frequency or the paging system's frequency, to enable selectively receiving signals on a paging channel or the selective call system channel. A power switch 82 coupled to the decoder/controller 68 is used to control the supply of power to the receiver 66, thereby providing a battery saving function, as is well known in the art for use with selective call receivers. When the paging channel is selected, the received paging address signals are processed by the decoder/controller 68, and when a paging address signal is detected which corresponds to an assigned address of the selective call receiver 40, the decoder/controller 68 generates an alert enable signal which can be coupled to an audible alerting device 84, such as an audible transducer, to provide an audible alert, or can be coupled to the tactile alerting device 80 to provide a silent alert. Selection of either audible or silent alerting is provided by the selector switches 76 in a manner well known in the art.

Figure 5:
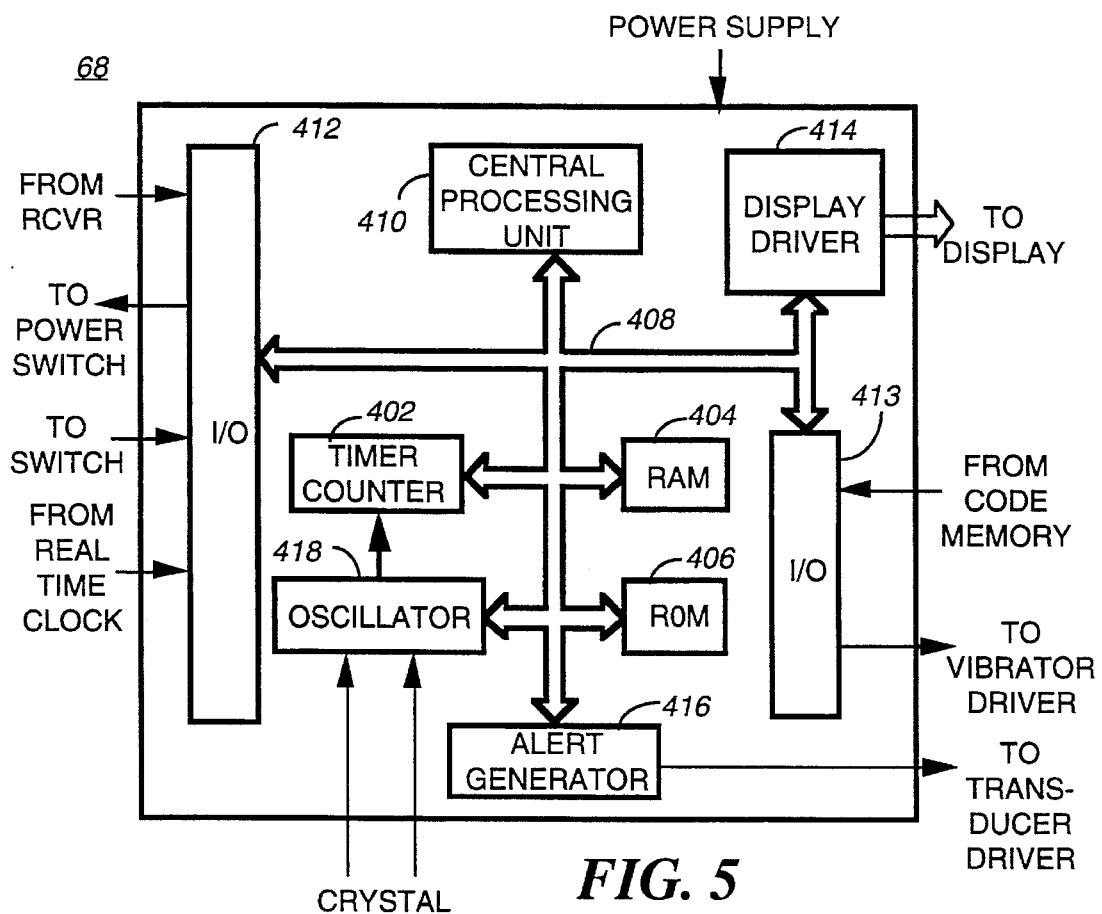
FIG. 5 is an electrical block diagram of a processor/controller of the selective call receiver of FIG. 4 in accordance with the preferred embodiment of the present invention.

The controller/decoder 68 of FIG. 4 can be implemented utilizing a microcomputer as shown in FIG. 5. FIG. 5 is an electrical block diagram of a microcomputer based decoder/controller suitable for use in the selective call receiver of FIG. 4. As shown, the microcomputer 68 is preferably of the family of MC68HC05 series microcomputers, such as manufactured by Motorola, Inc., which includes an on-board display driver 414. The microcomputer 68 includes an oscillator 418 which generates the timing signals utilized in the operation of the microcomputer 68. A crystal, or crystal oscillator (not shown) is coupled to the inputs of the oscillator 418 to provide a reference signal for establishing the microcomputer timing. A timer/counter 402 couples to the oscillator 418 and provides programmable timing functions which are utilized in controlling the operation of the receiver or the processor. A RAM (random access memory) 404 is utilized to store variables derived during processing, as well as to provide storage of FAX or paging information which are received during operation as a selective call receiver. A ROM (read only memory) 406 stores the subroutines which control the operation of the receiver or the processor which will be discussed further. It will be appreciated that in many microcomputer implementations, the programmable-ROM (PROM) memory area can be provided either by a programmable read only memory (PROM) or an EEPROM (electrically erasable programmable read only memory). The oscillator 418, timer/counter 402, RAM 404, and ROM 406 are coupled through an address/data/control bus 408 to a central processing unit (CPU) 410 which performs the instructions and controls the operations of the microcomputer 68.

The demodulated data generated by the receiver is coupled into the microcomputer 68 through an input/output (I/O) port 412. The demodulated data is processed by the CPU 410 and when the received address is the same as that stored within the code-plug memory which. couples into the microcomputer through, for example an I/O port 413, the selective call FAX message is received and stored in RAM 404. Recovery of the stored message, and selection of the predetermined destination address, is provided by the switches which are coupled to the I/O port 412. The microcomputer 68 then recovers the stored message and directs the information over the data bus 408 to the display driver 414 which processes the information and formats the information for presentation by the display (output display screen) 90 (FIG. 4) such as an LCD (liquid crystal display). When the selective call receiver 40 receives its address, the alert signal that is generated can be routed through the data bus 408 to an alert generator 416 that generates the alert enable signal which is coupled to the audible alert device that was described above. Alternatively, when the vibrator alert is selected, as described above, the microcomputer generates an alert enable signal which is coupled through data bus 408 to the I/O port 413 to enable generation of a vibratory, or silent alert.

The battery saver operation is controlled by the CPU 410. The battery saving signals are directed over the data bus 408 to the I/O port 412 which couples to the power switch 82 (FIG. 4). Power is periodically supplied to the receiver to enable decoding of the received selective call receiver address signals and the selective call FAX information which is directed to the selective call receiver 40. The information, preferably comprise the selective call FAX hand written text information, is stored and ready to be displayed on the display 90.

Figure 6:
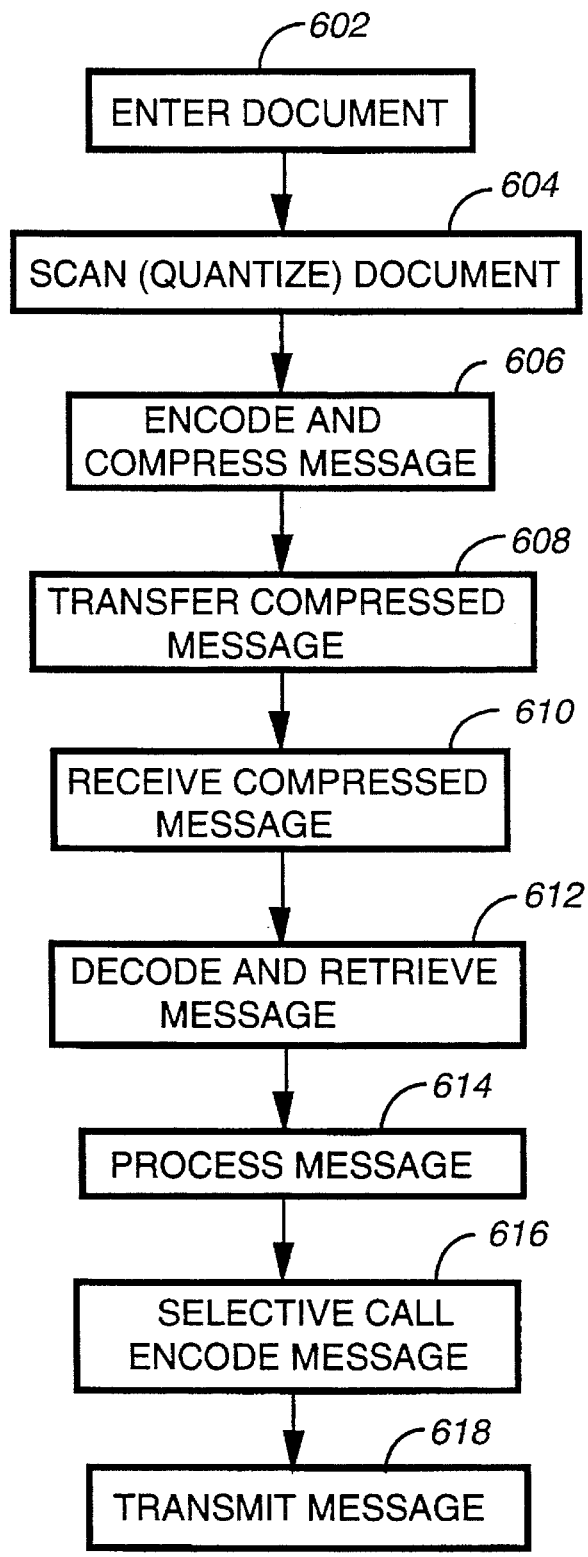
FIG. 6 is a flow diagram illustrating the operation of the selective call terminal in accordance with the preferred embodiment of the present invention.

Referring to FIG. 6, a flow diagram is shown illustrating facsimile communication in accordance with the preferred embodiment of the present invention. When the source document 26 has been entered, step 602, the FAX machine 14 scans and quantizes the information on the source document 26, step 604. The quantized information is then encoded and compressed, preferably according to the Group III facsimile standard, step 606. The encoded and compressed information is transferred from the FAX machine 14 to the message controller 22 via the PSTN 24, step 608. The message controller 22 receives the compressed information and stores it in memory to be accessed by the processor 20 which processes the compressed information before transmission to its designated selective call receiver 40, step 610.

The received information is then decoded from the Group 3 format to retrieve the information, step 612. The information is processed, step 614, according to the preferred embodiment of the present invention by thinning the lines of the image information and defining line segments of the image information to be extracted and encoded with the (x, y) co-ordinates to be discussed in detail below. The information is selective call encoded, step 616. In the selective call encoding step, the information is encoded with the address of the at least one selective call receiver 40 which the information is intended. The message is then transmitted to the at least one selective call receiver, step 616.

Figure 7:
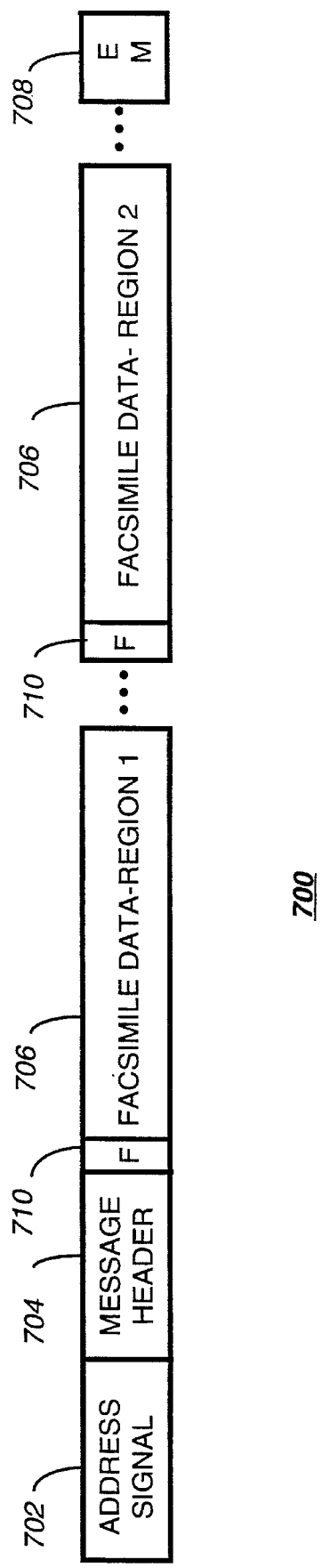
FIG. 7 is a protocol diagram of a selective call information signaling format in accordance with the preferred embodiment of the present invention.

Referring to FIG. 7, a protocol diagram of a selective call communication format is shown in accordance with the preferred embodiment of the present invention. The signaling protocol is used for addressing and transmitting facsimile information to the selective call receiver 40 using any facsimile standard. A FAX paging information packet 700 comprises a selective call address 702, a facsimile message header 704, format or message type identifier 710, data blocks 706 encoded in Group III facsimile data, and an end-of-message flag 708. The end-of-message flag 708 can be omitted without compromising the integrity of this signaling format. The address signal 702 comprises a conventional selective call address of a type that is well known to one of ordinary skill in the art. The message header 704 contains information on the data block length, FAX protocol type, a data flag to determine if a FAX or a regular paging message is being received and possibly an encryption type for use in a secure FAX messaging system. Following the message header 704 is the format identifier 710 which identifies the format of the information. Following the format identifier 710 is the data block 706 containing standard facsimile data of the format or type indicated by the format identifier. This embodiment can be used in conjunction with a conventional FAX machine to receive FAX messages via a wireless data channel. Furthermore, when used in conjunction with a personal computer or the like (e.g., a laptop computer), the selective call receiver 40 as illustrated in FIG. 4 can couple the received FAX message data to the computer for storage in a file, thus allowing the user to have an archive of the received FAX messages.

Figure 8:
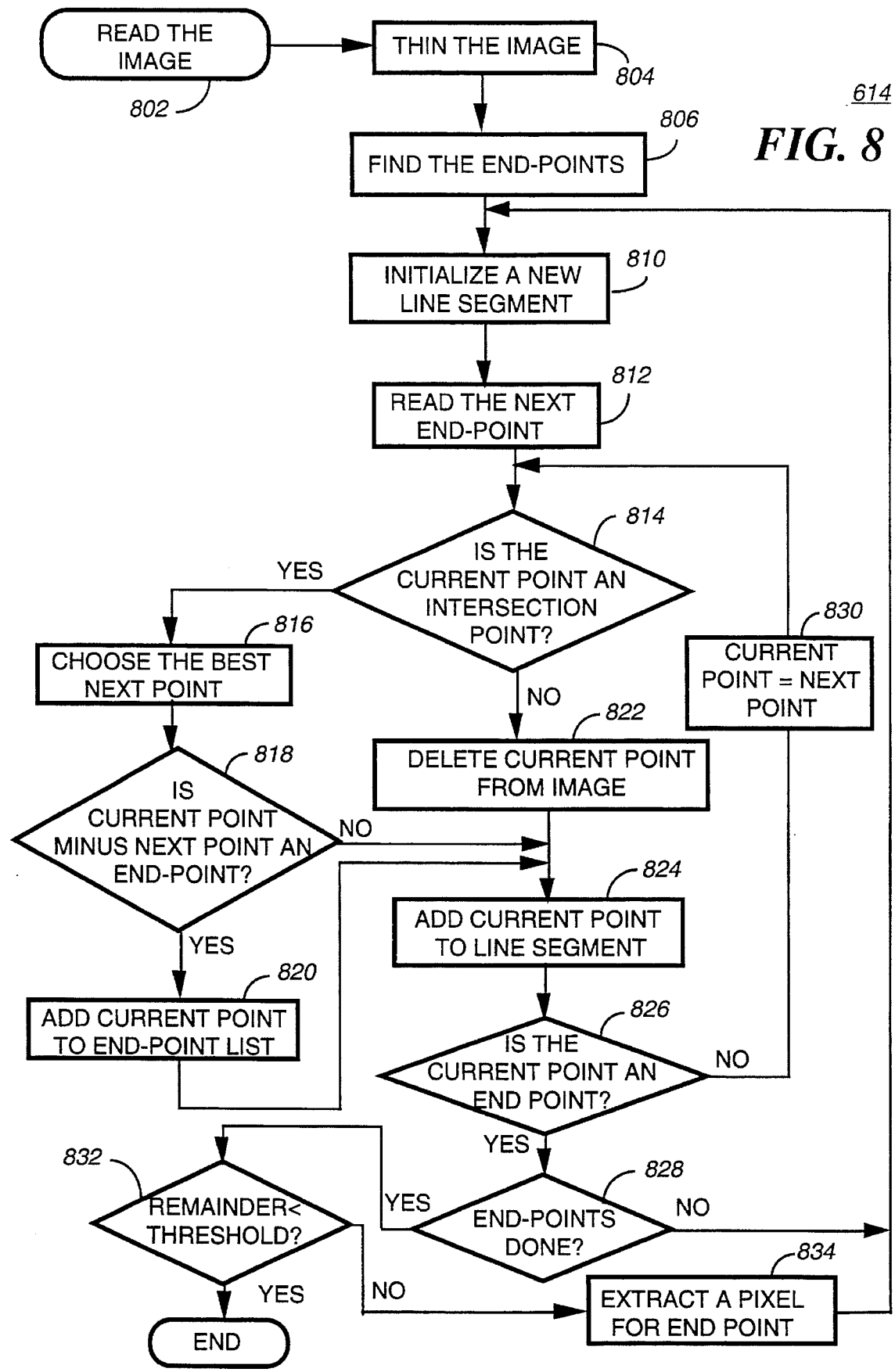
FIG. 8 is a flow diagram illustrating a more detail operation of selective call terminal in FIG. 1 according to the preferred embodiment of the present invention.

Referring to FIG. 8, a flow diagram of the processor of the selective call terminal is shown according to the preferred embodiment of the present invention. The image of the hand written information is read into the processor, step 802. The image comprises a FAX message transmission of the hand written or line drawing message from the fax machine. The hand written message signal is represented as a raster bit-map image downsampled and compressed using Huffman coding. It is desired to encode the hand written message such that it may by compressed using line-follow coding and stored in electronic ink format. The compression advantage of line coding can range from two to ten times over Huffman coding. Electronic ink compression, however, requires the dynamic sequence, i.e., the (x,y) co-ordinates, of ink pixels to be known. This information is not contained in the hand written information in a raster bit-map format. Therefore, to achieve the higher compression ratios of the electronic systems, the dynamic sequences (x, y) co-ordinates of the pixels must be recreated. This invention provides a means for representing a scanned line drawing, that does not have the dynamic pixel information, as ink to achieve both higher compression ratio and compatibility with electronic pen systems. To estimate line segments, the hand written message is reduced to a skeleton image for the purpose of determining the (x, y) coordinates. In step 806, the skeleton of the drawing is obtained by a thinning algorithm. Thinning reduces the line drawing to single pixel thickness so that any pixel not at an intersecting node has at most two neighbors. FIG. 3 illustrates a scanned line drawing before and after thinning. After the thinning algorithm is used to obtained the skeleton of the hand written message, the end point of the line drawings are located, step 812

The method of locating the scanned lines are accomplished by a two-pass iterative procedure on the hand written message. The first pass locates lines with end points and the second pass operates on lines that do not have end points. After the first pass process, it is possible that new scanned lines with end points have been created by the extraction of the previous scanned lines, therefore the process may need more than one iteration. During the first pass the end points of the thinned drawing are determined, i.e., end point pixels are pixels that have no more than one neighbor. Once an end point is located, the thinned image is traced and each pixel that are determined to be part of a line segment is extracted, i.e., the (x, y) co-ordinates are stored and the pixel is erased. The process continues until an end point is encountered thus defining the line segment. The line segment is then formed by simply the ordered sequence of (x,y)-co-ordinates between end points.

When a pixel (or x–y point) is located, it is determined whether the pixel is at an intersection, for example if there are more than one adjacent pixels, step 814. If not, the pixel is deleted from the image, step 822; and the co-ordinate points of the deleted pixel are added to the line segment, step 824. After the addition of the co-ordinate points to the line segment, the pixel is checked to determine if it is an end-point, step 826. If not, the current point is initialized to the next point, step 830. After the initialization step, the flow continues to step 814. Alternatively, when the end point is located at step 826, the line segment is completely extracted and step 828 checks if the end points have all been processed. If not, the flow continues to step 810. However, if all line segments with end points have been extracted, step 832 checks if the remaining pixels are fewer that a predefined threshold. If yes, the process is terminated. If not, then, remaining information comprises line without end points, for example enclosed regions like "O". Step 834 extracts a pixel to create a new end point. The non end point line segments are processed in a second pass by selecting any pixel as the starting point in the line and proceeding in any direction erasing each pixel as it is extracted until an end point is encountered. Note that an end point was created when the first pixel of the line segment was extracted. This two pass procedure is iterated until there are no more pixels to process. Iterating is complete when all the pixels are extracted or the number of pixels to be processed falls below some predefined threshold number.

If at step 814, the current point or pixel is at an intersection, the best path or most logical path is chosen, step 816. In choosing the best path, for example, the current line segment is terminated and a new line segment is started. Another strategy is to continue the line segment by choosing the most likely path. The most likely path can be chosen based on the closest (lowest or minimum) slope angle or angular slope to the intersecting line segment. The second strategy is slightly more computational but gives better performance since, in general, higher compression can be achieved with longer line segments.

In order to keep track of which paths have already been traced, it is helpful to erase pixels as they are used-up to form line segments. In this way, the line drawing gets sparser as the line segments are extracted. However, it should be observed that if maximum length line segments are to be obtained to provide high compression then it is necessary that the pixel at an intersection not be deleted. This pixel will eventually be deleted when the last line segment that intersects that node is extracted. At step 818, if the current pixel minus the next pixel is not end point, the flow continues to step 824 where the current pixel is added to the line segment. When the current pixel minus the next pixel is an end point, the co-ordinates of the current pixel is added to the end point list, step 820 and the process continues to step 824 by adding the current pixel to the line segment.

Once all the line segments have been extracted, the line drawing has been converted from a bit-map image representation to ink representation. It can now be compressed, stored and rendered exactly the same way as if it was captured directly from an electronic pen tablet.

Figure 9:
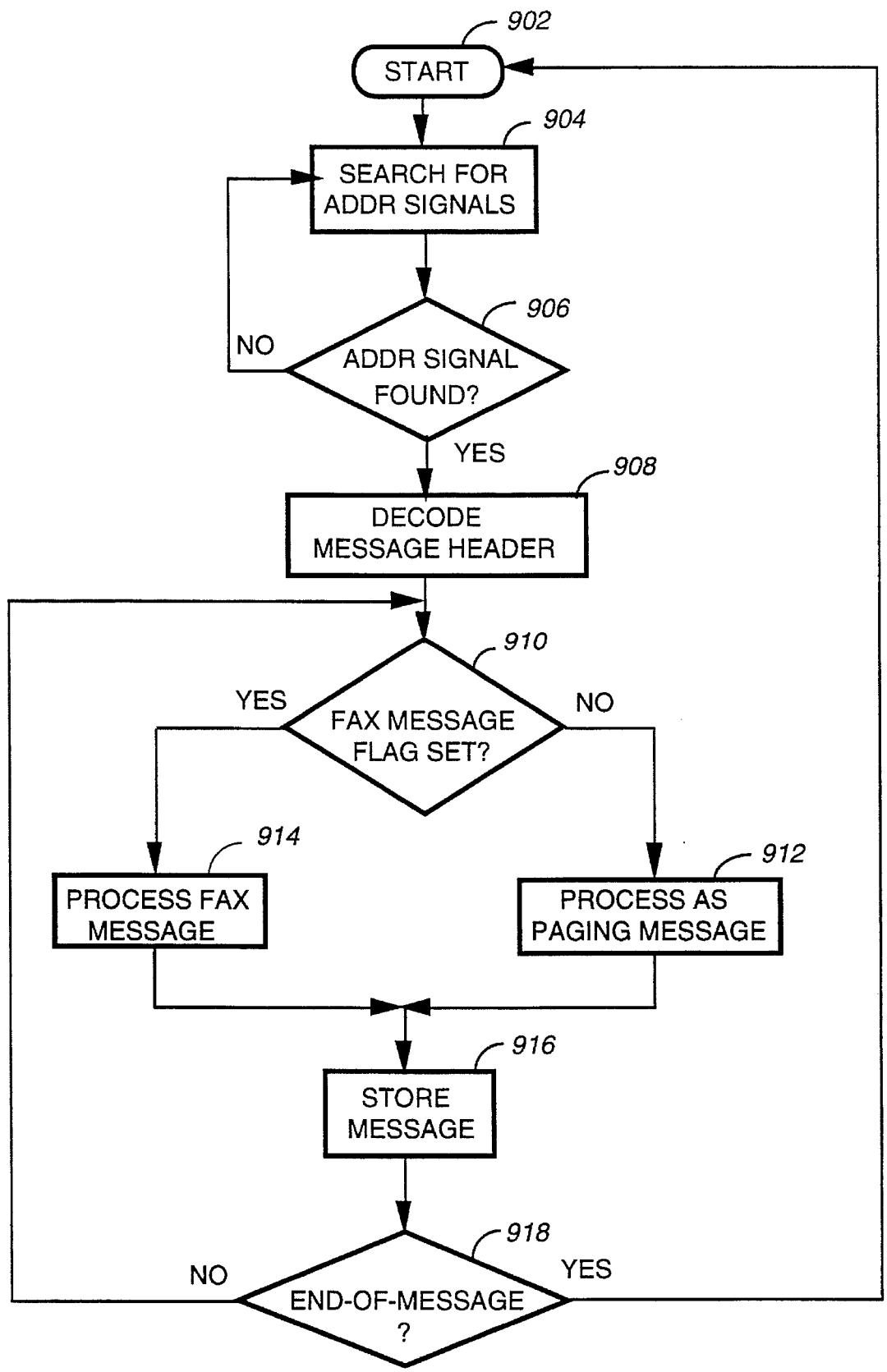
FIG. 9 is a flow diagram illustrating the operation of the selective call receiver in FIG. 4 according to the preferred embodiment of the present invention. service provider maintains a list of FAX capable cap-code numbers (addresses) and upon receiving the entered cap-code number, a procedure to receive a facsimile message is initiated, the details will be discussed below. The user, according to the preferred embodiment of the present invention, enters the address of the selective call receiver 40 to which the FAX is intended and other system information along with, preferably, the hand written text message or line drawing information. The source document 26 is then scanned into a FAX machine 14. The information is encoded and compressed by the encoder 34 of the FAX machine 14 and transferred by the modem 36 via the network interface 24 to the selective call terminal 28 which will produce a paging FAX message that will be transmitted to a targeted subscriber. The method, protocol, and apparatus required for the transmission of the paging message will be discussed in detail below.

Referring to FIG. 9, the flow diagram illustrates the receiving operation of the selective call receiver of FIG. 4. The process of receiving a selective call message or information begins at step 902. In step 904, the address decoder searches a received signal for an address signal. Step 906 tests any recovered address signals to determine if they correlate with at least one predetermined address associated with the selective call receiver 40. If the received address does not correlate (match), control is returned to step 904 and a new search is performed. When a received address correlates with at least one predetermined address associated with the selective call receiver, step 908 decodes the message header then passes control to step 910. Step 910 tests for the presence of a FAX data flag. If step 910 is false, the following data block will contain symbols that will be decoded as a conventional paging or selective call message, step 912. When decoding is complete, step 916 stores the information and step 918 tests for an end of message condition which may be indicated by an end-of-message marker or the lack of another data flag. If step 918 is false (not yet at end of message) the processing continues to step 910. When step 910 is true, the following data block will contain a FAX message or information. The FAX message is processed and decoded in step 912, and stored, step 916. When step 918 is true, control is returned to step 902 and the address decoder resumes searching for valid addresses.

The image comprises a FAX Message transmission of a hand written message from a fax machine. The hand written note signal is represented as a raster bit-map image downsampled and compressed using Huffman coding. It is desired to encode the hand written message such that it may by compressed using line-follow coding to compress and store as electronic ink. The compression advantage of line coding can range from 2 to 10 over Huffman coding. Electronic ink compression, however, requires that the dynamic sequence, i.e., the (x,y) co-ordinates, of ink pixels be known. This information is not contained with the hand written information in a bit mapped format. Therefore, to achieve the higher compression ratios of the electronic systems, the dynamic sequences (x, y) co-ordinates of the pixels must be recreated. This invention provides a means for representing a scanned line drawing, that does not have the dynamic pixel information, as ink to achieve both higher compression and compatibility with pen systems.

In summary, in a selective call communication system, a method for facsimile communication, comprising the steps of: (a) retrieving information hand written information from a source document; (b) encoding and compressing the hand written information; (c) transferring the hand written information to a selective call terminal; (d) receiving the hand written information at the selective call terminal; and (e) processing the hand written information in the selective call terminal. The step of processing comprising the step of: (f) thinning each line of the hand written information; (g) locating the lines of the hand written information having end points; (h) extracting the lines of the hand written information; and (i) defining portion of the hand written information as line segments; (k) organizing the line segments to recover the hand written information; and (f) transmitting the line segments of hand written information to an at least one selective call receiver capable of receiving facsimile information.

What is claimed is:

1. In a selective call communication system, a method for facsimile communication, comprising the steps of:
   (a) retrieving hand written information from a source document;
   (b) encoding and compressing the hand written information;
   (c) transferring the hand written information to a selective call terminal;
   (d) receiving the hand written information at the selective call terminal;
   (e) processing the hand written information in the selective call terminal, the step of processing comprising the step of:
   (f) thinning the hand written information;
   (g) locating lines of the hand written information having end points and lines of hand written information having no end points;
   (h) extracting the lines of the hand written information by erasing pixels as an ordered sequence of (x,y) co-ordinates between end points; and
   (i) organizing line segments to recover the hand written information; and
   (j) transmitting the line segments of hand written information to an at least one selective call receiver capable of receiving facsimile information.

2. The method according to claim 1 wherein the step of locating the lines having end points further comprising the step of locating lines having no end points after the step (h) of extracting have extracted all the lines having end points.

3. The method according to claim 1 wherein said step of thinning reduces the lines of the hand written information to one pixel wide.

4. The method according to claim 3 wherein said step of extracting the lines with end points comprising the steps of: beginning at a first end point on the lines with end points of the hand written information;
   locating adjacent pixel in the lines of the hand written information;
   assigning an (x, y) co-ordinate point to each pixel located;
   erasing pixels being assigned the (x,y) co-ordinate point; and
   terminating the step of extracting on an occurrence of the second end point in the lines of the hand written information.

5. The method according to claim 4 wherein the step of extracting further comprising the steps of:
   determining when a pixel in the lines of the hand written information is at an intersecting point; and
   selecting a path having a minimum angular slope.

6. The method according to claim 1 wherein said step of extracting the lines without end points comprising the steps of:

beginning at any pixel on the lines without end points of the hand written information;

locating adjacent pixels in the lines of hand written information;

assigning an (x, y) co-ordinate point to each pixel located;

erasing pixels being assigned the (x,y) co-ordinate point; and terminating the step of extracting on an occurrence of the first end point in a line of the hand written information.

7. The method according to claim 6 wherein the step of extracting further comprising the steps of:

determining when a pixel in the lines of the hand written information is at an intersecting point; and selecting a path having a minimum angular slope.

8. A selective call communication system for receiving hand written information from a facsimile machine to be delivered to a plurality of selective receivers capable of receiving information, comprising:

the facsimile machine for retrieving the hand written information from a source document; the facsimile machine further comprising:

an encoder for encoding and compressing the hand written information; and a modem, coupled to said encoder, for transferring the hand written information to a selective call terminal; the selective call terminal, comprising:

a receiver for receiving the hand written information;

a processor, coupled to said receiver, for processing the hand written information, the processor further comprising:

an image thinner for thinning the hand written information;

a line segment locator for locating lines of the hand written information having end points and lines of hand written information having no end points:

a line segment extractor for extracting the lines of the hand written information by erasing pixels as an ordered sequence of (x,y) co-ordinates between end points;

a line segment organizer for organizing line segments to recover the hand written information; and a transmitter for transmitting the lines of hand written information to an at least one selective call receiver capable of receiving facsimile information.

9. The selective call communication system according to claim 8 wherein the line segment locator further locates lines having no end points in response to the line segment extractor extracting the lines having end points.

10. The selective call communication system according to claim 8 wherein the image thinner reduces the lines of the hand written information to one pixel wide.

11. The selective call communication system according to claim 8 wherein image extractor extracts the lines with end points beginning at a first end point on the lines with end points of the hand written information, the selective call communication system further comprising:

a line segment locator locating adjacent pixel in the lines of hand written information; and wherein the image extractor assigning an (x, y) co-ordinate point to each pixel located;

erasing pixels being assigned the (x,y) co-ordinate point; and terminating the step of extracting on an occurrence of a second end point in the lines of the hand written information.

12. In a selective call communication system, a method for facsimile communication, comprising the steps of:

(a) retrieving hand written information from a source document;

(b) encoding and compressing the hand written information;

(c) transferring the hand written information to a selective call terminal;

(d) receiving the hand written information at the selective call terminal;

(e) processing the hand written information in the selective call terminal, the step of processing comprising the step of:

(f) thinning the hand written information to one pixel wide;

(g) locating lines of the hand written information having end points and lines of hand written information having no end points;

(h) extracting the lines of the hand written information by erasing pixels as an ordered sequence of (x,y) co-ordinates between end points wherein the step of locating in response to the step (h) of extracting locates the lines having no end points after the lines having end points have been extracted, said step of extracting the lines with end points further comprising the steps of:

beginning at a first end point on the lines with end points of the hand written information;

assigning an (x, y) co-ordinate point to each pixel located; and terminating the step of extracting on an occurrence of a second end point in the lines of the hand written information;

(i) organizing line segments to recover the hand written information; and (j) transmitting the line segments of hand written information to an at least one selective call receiver capable of receiving facsimile information.

13. The method according to claim 12 wherein the step of extracting further comprising the steps of:

determining when a pixel in the lines of hand written information is at an intersecting point; and selecting a path having a minimum angular slope.

14. The method according to claim 12 wherein said step of extracting the lines without end points comprising the steps of:

beginning at any pixel on the lines without end points of the hand written information;

locating adjacent pixels in the lines of hand written information;

assigning an (x, y) co-ordinate point to each pixel located;

erasing pixel assigned the (x,y) co-ordinate and terminating the step of extracting on the occurrence of the first end point in the lines of the hand written information.

15. The method according to claim 12 wherein the step of extracting further comprising the steps of:

determining when a pixel in the lines of hand written information is at an intersecting point; and selecting a path having a minimum angular slope.

16. A method for extracting segments from a scanned image, comprising the steps of:

(a) receiving the scanned image;

(b) thinning the scanned image;

(c) locating the segments of the scanned image having end points and segments having no end points;

(d) extracting the segments by erasing pixels as an ordered sequence of (x,y) co-ordinates between end points;

(e) organizing the segments to recover the scanned image;

(f) transmitting the segments to an at least one selective call receiver.

17. The method according to claim 16 wherein the step of locating the segments further comprising the steps of:

identifying segments having end points and segments having no end points; and creating end points in the segments having no end points.

18. The method according to claim 16 wherein said step of extracting segments with end points comprising the steps of:

beginning at a first end point on the segment having end points; locating adjacent pixel in the segment;

assigning an (x, y) co-ordinate point to each pixel located;

erasing pixels being assigned the (x,y) co-ordinate point; and terminating the step of extracting on an occurrence of the second end point in the segment.

19. The method according to claim 18 wherein the step of extracting further comprising the steps of:

determining when a pixel in the segment is at an intersecting point; and selecting a path having a minimum angular slope.

20. The method according to claim 16 wherein said step of extracting the segments without end points comprising the steps of:

beginning at any pixel on the segment without end points;

locating adjacent pixels in the segment;

assigning an (x, y) co-ordinate point to each pixel located;

erasing pixel being assigned the (x,y) co-ordinate point; and terminating the step of extracting on an occurrence of a point where the pixels was erased in the segment.

* * * * *

UNITED STATES PATENT AND TRADEMARK OFFICE
CERTIFICATE OF CORRECTION

PATENT NO. : 5,623,345

DATED : April 22, 1997

INVENTOR(S) : Merchant et al.

It is certified that error appears in the above-indentified patent and that said Letters Patent is hereby corrected as shown below:

Column 12, line 53, delete "pixel" and insert --pixels being--.

Column 12, line 53, after "co-ordinate" insert --point--.

Signed and Sealed this

Sixteenth Day of September, 1997

Attest:

BRUCE LEHMAN

*Attesting Officer*

*Commissioner of Patents and Trademarks*